(12) United States Patent
Settineri

(10) Patent No.: US 7,237,665 B2
(45) Date of Patent: Jul. 3, 2007

(54) THERMAL ENERGY TRANSFER LIMITED ROTATING SHAFT FOR A PNEUMATIC FAN DRIVE SYSTEM

(75) Inventor: Samuel E. Settineri, Marshall, MI (US)

(73) Assignee: BorgWarner Inc., Auburn Hills, MI (US)

( * ) Notice: Subject to any disclaimer, the term of this patent is extended or adjusted under 35 U.S.C. 154(b) by 118 days.

(21) Appl. No.: 10/904,393

(22) Filed: Nov. 8, 2004

(65) Prior Publication Data
US 2006/0096831 A1   May 11, 2006

(51) Int. Cl.
F16D 13/24 (2006.01)
F16D 13/72 (2006.01)

(52) U.S. Cl. ............. 192/91 A; 192/89.27; 192/113.21

(58) Field of Classification Search ............. None
See application file for complete search history.

(56) References Cited

U.S. PATENT DOCUMENTS

| | | | |
|---|---|---|---|
| 2,853,168 A * | 9/1958 | Spase .............. | 192/104 C |
| 3,757,914 A * | 9/1973 | Elmer .............. | 192/82 T |
| 3,777,866 A | 12/1973 | Elmer | |
| 3,862,443 A * | 1/1975 | Edick .............. | 310/57 |
| 3,985,214 A * | 10/1976 | Hall et al. ........ | 192/91 A |
| 4,044,729 A | 8/1977 | Elmer | |
| 4,830,161 A | 5/1989 | Hall et al. | |
| 5,005,686 A | 4/1991 | Reik et al. | |
| 5,669,478 A | 9/1997 | Schierling et al. | |
| 6,257,674 B1 * | 7/2001 | Dagh et al. ......... | 301/6.3 |
| 6,318,511 B1 | 11/2001 | Clement et al. | |
| 2001/0043019 A1 * | 11/2001 | Heyden et al. ...... | 310/74 |
| 2002/0121420 A1 | 9/2002 | Medamaranahally | |
| 2005/0205366 A1 * | 9/2005 | Plantan ............. | 188/71.1 |
| 2006/0076210 A1 * | 4/2006 | Settineri | |
| 2006/0081123 A1 * | 4/2006 | Clayton et al. ...... | 92/169.1 |

* cited by examiner

Primary Examiner—Rodney H. Bonck
(74) Attorney, Agent, or Firm—Greg Dziegielewski, Esq.; Artz & Artz, P.C.

(57) ABSTRACT

A clutch assembly (20) for a fan drive system (12) of an engine (14) includes a translatable clutch housing (30) that is coupled to a fan (16). A rotating shaft (27) has a non-grooved thermal energy transfer portion (28) that is coupled to a drive pulley (32) of the engine (14). A liner (34) resides between and is engageable with the rotating shaft (27) and the translatable clutch housing (30). The engagement thereof generates thermal energy. The non-grooved thermal energy transfer portion (28) has a cross-sectional thickness ($T_1$) of approximately less than 11 mm and transfers a significant portion of the thermal energy to the drive pulley (32).

12 Claims, 3 Drawing Sheets

THERMAL ENERGY TRANSFER LIMITED ROTATING SHAFT FOR A PNEUMATIC FAN DRIVE SYSTEM

TECHNICAL FIELD

The invention relates generally to fan drive systems and more specifically to reducing the flow of thermal energy generated within a clutch interface area from passing to internal clutch bearings within a pneumatically controlled fan drive system.

BACKGROUND ART

The present invention relates to friction coupling devices that drive radiator cooling fans. A common friction coupling device is that of the dry friction drive style. Dry friction drives are used for their simplicity, cool operating temperature, and ability to turn at fully engaged peak operating speeds.

Although the present invention may be used advantageously in various configurations and applications, it is especially advantageous in a coupling device of the type used to drive a radiator cooling fan of an internal combustion engine for a over the road truck, such as a class 8 truck, and will be described in connection therewith.

Dry friction drives tend to have two operating conditions "ON and OFF", which refers to when an associated friction clutch is either fully engaged or fully disengaged. When a friction clutch assembly is fully engaged the assembly provides cooling to an associated engine and is not slipping. When a friction clutch assembly is fully disengaged slip speed between a clutch plate and an engagement surface is at a maximum.

During the actuation of a dry friction clutch between full engagement and full disengagement the friction clutch area, referred to as the area in which there is contact between surfaces of a friction liner and a rotating shaft, generates heat or thermal energy. A certain amount of the generated thermal energy passes through the shaft to the internal clutch bearings. This passage of thermal energy to the internal bearings can degrade the bearings over time and is thus undesirable. The thermal energy transfer between the shaft and the bearings increases the operating temperature of the bearings, which in turn causes the breakdown of bearing lubricant or grease and decreases the operating efficiency and life of the bearings.

Thus, there is a need for an improved friction clutch assembly that reduces the amount of thermal energy transfer between a rotating shaft, within a friction clutch area, and internal clutch bearings. It is also desirable that the improved friction clutch assembly be similar in complexity and cost to that of traditional friction fan drive systems.

SUMMARY OF THE INVENTION

The present invention addresses the issues described above and provides a clutch assembly for a fan drive system of an engine. The clutch assembly includes a translatable clutch housing that is coupled to a fan. A rotating shaft has a non-grooved thermal energy transfer portion that is coupled to a drive pulley of the engine. A liner resides between and is engageable with the rotating shaft and the translatable clutch housing. The engagement thereof generates thermal energy. The non-grooved thermal energy transfer portion has a cross-sectional thickness of approximately less than 11 mm and transfers an increased portion of the thermal energy to the drive pulley.

The embodiments of the present invention provide several advantages. One such advantage is the provision of a rotating shaft having a thermal energy transfer portion that transfers an increased amount of thermal energy to a drive pulley of a clutch assembly. In so doing, the rotating shaft limits and minimizes the amount of thermal energy that is transferred to internal clutch bearings.

Another advantage provided by an embodiment of the present invention is the provision of a rotating shaft having a thermal energy transfer portion with a shaft width that is approximately equal to or greater than a shaft contact surface area width of a drive pulley. This provides efficient thermal energy transfer between the shaft and the pulley, which "pinches off" or minimizes the amount of thermal energy that is transferred to internal clutch bearings.

Yet another advantage provided by another embodiment of the present invention is the provision of a rotating shaft having a thermal energy transfer portion with one or more corresponding grooves that have a total groove width that is approximately equal to or greater than a shaft contact surface area width of a drive pulley. This also provides efficient thermal energy transfer between the shaft and the pulley, which also minimizes the amount of thermal energy that is transferred to internal clutch bearings.

Furthermore, the present invention provides an improved clutch assembly that is simple in design and cost effective.

The present invention itself, together with attendant advantages, will be best understood by reference to the following detailed description, taken in conjunction with the accompanying figures.

DETAILED DESCRIPTION

Figure 1:
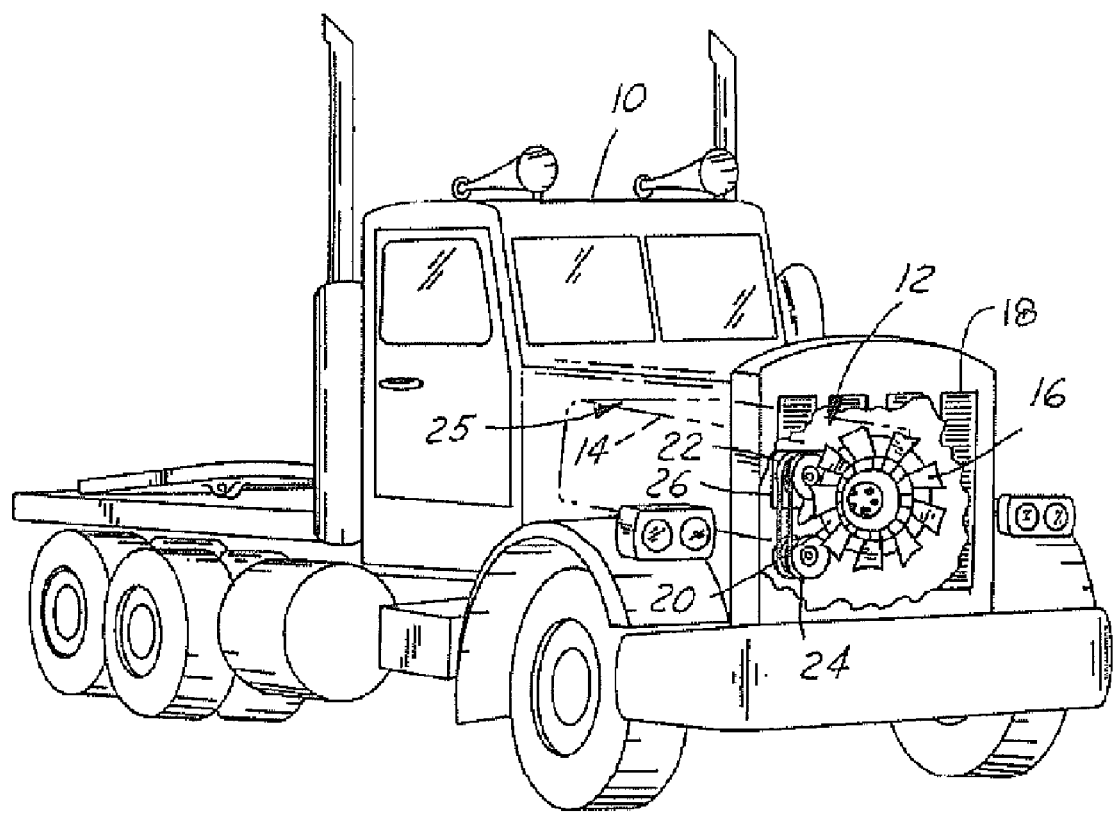
FIG. 1 is a perspective view of a vehicle utilizing a fluidically controlled fan drive system in accordance with an embodiment of the present invention.

In the following figures the same reference numerals will be used to refer to the same components. While the present invention is described primarily with respect to a system for preventing the flow of thermal energy generated within a clutch interface area from passing to internal clutch bearings within a pneumatically controlled fan drive system, the present invention may be adapted and applied to various systems including: hydraulic systems, electrical systems, pneudraulic systems, mechanical systems, pneumatic systems, vehicle systems, cooling systems, fan drive systems, friction drive systems, or other systems.

In the following description, various operating parameters and components are described for one constructed embodiment. These specific parameters and components are included as examples and are not meant to be limiting.

Also, in the following description various fan drive components and assemblies are described as an illustrative example. The fan drive components and assemblies may be modified depending upon the application.

Referring now to FIG. 1, a perspective view of a vehicle 10 utilizing a fluidically controlled fan drive system 12 in accordance with an embodiment of the present invention is shown. The system 12 uses rotational energy from a liquid cooled engine 14 at an increased ratio to turn a radiator cooling fan 16 to provide airflow through a radiator 18. The system 12 includes a friction clutch assembly 20 that is fixed to one or more pulleys, such as pulley 22, which is coupled to and rotates relative to a crankshaft (not shown) of the engine 14. The pulleys rotate via a pair of belts 24, within an engine compartment 25. Of course, the present invention may be relatively operative in relation to various components and via any number of belts or other coupling devices, such as a timing chain. The friction clutch assembly 20 is mounted on the engine 14 via a mounting bracket 26. The friction clutch assembly 20 pneumatically engages the fan 16 during desired cooling intervals to reduce the temperature of the engine 14.

The fan 16 may be attached to the friction clutch assembly 20 by any suitable means, such as is generally well known in the art. It should be understood, however, that the use of the present invention is not limited to any particular configuration of the system 12, or fan mounting arrangement, or any particular application for the system 12, except as is specifically noted hereinafter.

Figures 2, 3:
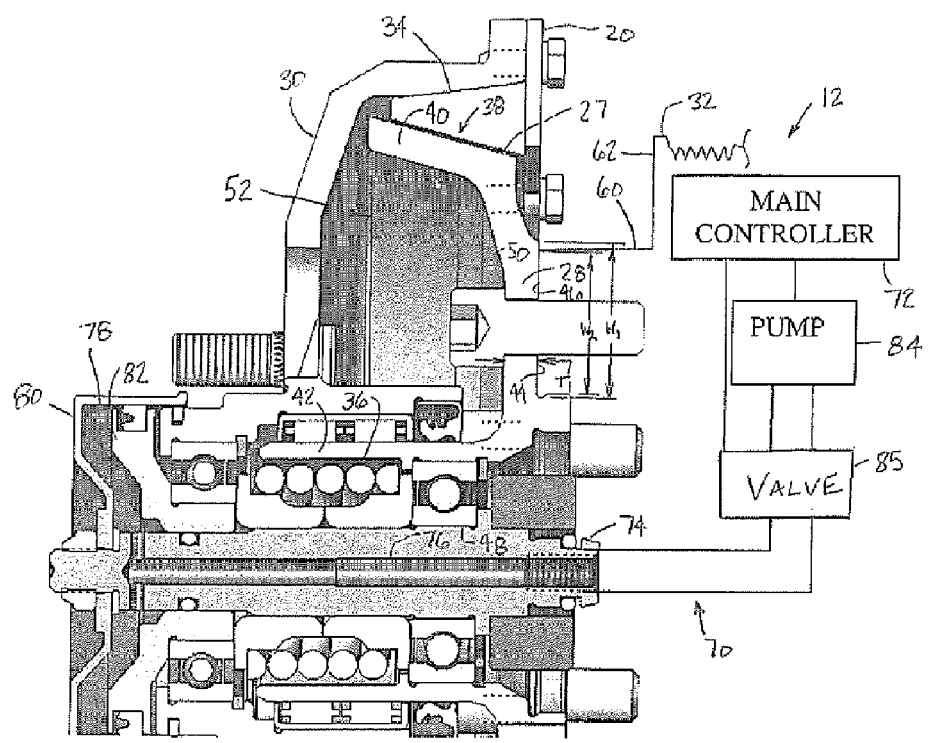
FIG. 2 is a quarter side cross-sectional view of a friction clutch assembly having a rotating shaft with a non-grooved thermal energy transfer portion in accordance with an embodiment of the present invention.
FIG. 3 is a cross-sectional view of a friction clutch assembly having a rotating shaft with an oversized groove in accordance with another embodiment of the present invention.

Referring now to FIG. 2, a quarter side cross-sectional view of the friction clutch assembly 20 having a rotating shaft 27 with a non-grooved thermal energy transfer portion 28 in accordance with an embodiment of the present invention is shown. The assembly 20 includes a translatable clutch housing 30 and a rotating shaft 27. The clutch housing 30 is attached to an engine cooling fan, such as fan 16. The rotating shaft 27 is coupled to a drive pulley 32, within the transfer portion 28. A friction liner 34 is coupled to the clutch housing 30 and resides between the clutch housing 30 and the rotating shaft 27. A clutch spring 36 engages the clutch housing 30 with the rotating shaft 27 in a friction clutch engagement area 38. In operation, the drive pulley 32 rotates in turn rotating the shaft 27, which when engaged rotates the housing 30. During engagement of the housing 30, thermal energy is generated by the contact between the friction liner 34 and the shaft 27, and a certain amount of the thermal energy is transferred through the transfer portion 28 into the drive pulley 32.

The rotatable or rotating shaft 27 has the transfer portion 28, as well as a friction contact portion 40 and a spring/bearing portion 42. In this configuration, the shaft 27 also has a forward internal side 50 that is tapered rearward towards the drive pulley 32. The transfer portion 28 is generally vertical in orientation, whereas the friction contact portion 40 and the spring/bearing portion 42 are generally horizontal In orientation. The transfer portion 28 has a pulley contact surface 44 that corresponds with a shaft contact surface 48 on the pulley 32. The pulley contact surface width $W_1$ is approximately equal to or greater than the shaft contact surface width $W_2$.

The transfer portion 28 has a reduced thickness $T_1$ as compared to traditional transfer portions of prior shafts. Although the transfer portion 28 may have a thickness of approximately between 6.0–11.0 mm, the thickness $T_1$ of the transfer portion 28, as shown, is approximately equal to 6.2 mm. A thickness of approximately 6.2 mm provides the shaft 27 with sufficient thickness to withstand forces experienced during the operation of the friction assembly 20 and is sufficiently thin to resist thermal energy flow to the clutch bearings 48 and force an increased thermal energy transfer from the shaft 27 to the pulley 32.

The pulley 32 includes a center protruding portion 60 and a pulley portion 62. The center portion 60 extends forward away from the pulley portion 62 and is in contact with the shaft 27. The center portion 60 includes the shaft contact surface 46 and is coupled to the shaft 27. The pulley 32 may be coupled directly to the shaft 27 or indirectly via one or more thermal energy transfer coupling elements (not shown with respect to the embodiment of FIG. 2). An example thermal energy transfer coupling element 64 is shown in FIG. 3. The thermal energy transfer coupling elements may be used to further absorb thermal energy from the shaft 27. The pulley 32 and the thermal energy transfer coupling elements perform as heat sinks and as such may be formed of various thermal energy conductive or heat sink materials known in the art. The pulley 32 and the thermal energy transfer coupling elements may, for example, be formed of steel, aluminum, copper, or a combination thereof.

The friction clutch assembly 20 also includes a fluidic control circuit 70 that is operated via a main controller 72. The fluidic control circuit 70 includes a piston rod or pneumatic transfer conduit 74 with a fluid channel 76 residing therein for the transfer of fluid, such as air, into a piston reservoir 78 of an air cylinder 80. The air cylinder 80 resides over a piston 82. A fluid pump 84 and a corresponding valve 85 are fluidically coupled to the fluid channel 76. The main controller 72 is coupled to the pump 84 and to the valve 85 and adjusts the flow of the fluid into and out of the reservoir 78. The valve 85 may, for example, be in the form of a solenoid.

The main controller 72 may be contained within the system 12 or may be separate from the system 12 as shown. The main controller 72 may be microprocessor based such as a computer having a central processing unit, memory (RAM and/or ROM), and associated input and output buses. The main controller 72 may be a portion of a central vehicle main control unit, an interactive vehicle dynamics module, a cooling system controller, or may be a stand-alone controller as shown.

The friction clutch assembly 20 is frequently engaged. When engaged no fluid is pumped into the reservoir 78. The piston 82 and thus the housing 30 are in a fully engaged position. In the engaged position the spring 36 is decompressed or in an expanded state. When cooling is no longer desired the main controller 72 pumps fluid into the reservoir 78, which causes the piston 82 to shift rearward, towards the shaft 27. As the piston 82 shifts rearward, the housing 30 also shifts rearward, thereby, compressing the spring 36 and causing the friction liner 34 and thus the housing 30 to disengage with the shaft 27.

Referring now to FIG. 3, a cross-sectional view of a friction clutch assembly 20' having a rotating shaft 27' with an oversized groove 90 in accordance with another embodiment of the present invention is shown. The oversized groove 90 is in the thermal energy transfer portion 28 and is horizontally in-line with the shaft contact surface 46' of the drive pulley 32'. The groove 90 has a groove width $W_3$ that is approximately equal to or greater than that of the shaft contact surface width $W_2$'. As shown, the thermal energy transfer portion 28' has a thickness $T_2$ that is approximately equal to 6.2 mm. The groove 90 is in the form of a recessed ring on an internal side 50' of the shaft 27'.

Figure 4:
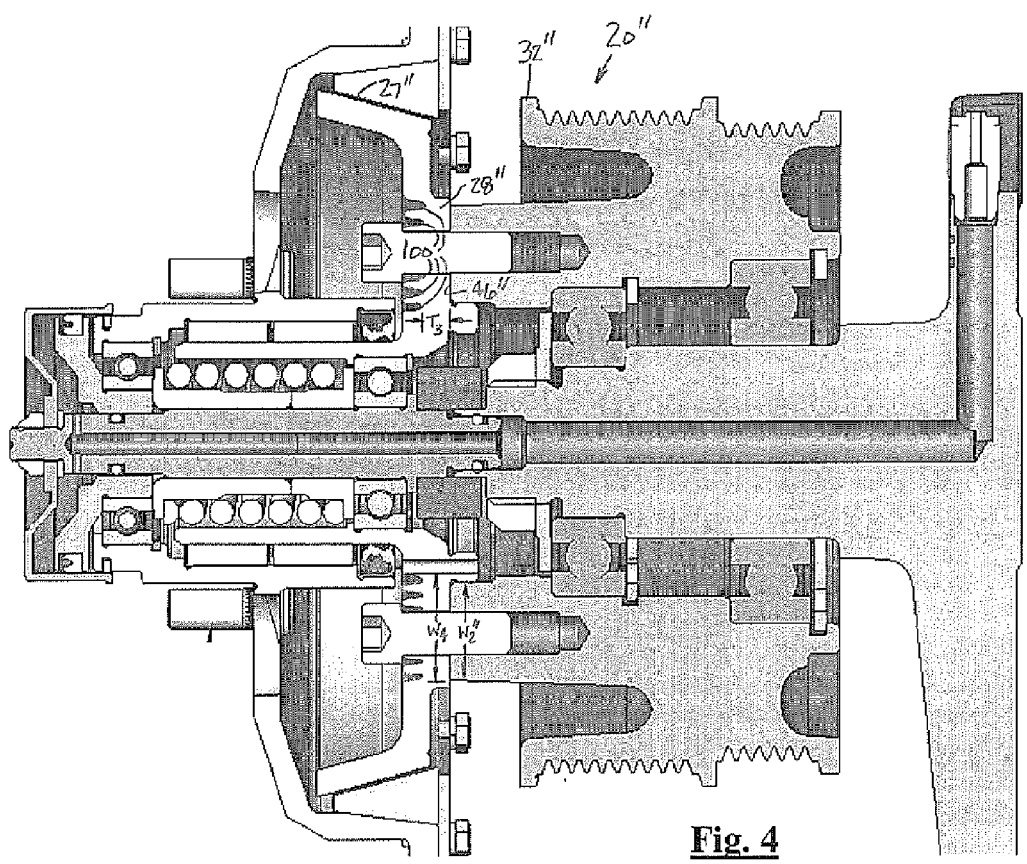
FIG. 4 is a cross-sectional view of a friction clutch assembly having a rotating shaft with multiple grooves in accordance with still another embodiment of the present invention.

Referring now to FIG. 4, a cross-sectional view of a friction clutch assembly 20" having a rotating shaft 27" with multiple grooves 100 in accordance with still another embodiment of the present invention is shown. The grooves 100 are in the thermal energy transfer portion 28" and are horizontally in-line with the shaft contact surface 46" of the drive pulley 32". The grooves 100 have a total groove area width $W_4$ that is approximately equal to or greater than that of the shaft contact surface width $W_2$". As shown, the transfer portion 28″ has a thickness $T_3$, between the grooves 100 and the pulley 32″, that is approximately equal to 6.2 mm. The grooves 100 are in the form of recessed rings on an internal side of the shaft 27″.

The present invention provides a fan drive system having a rotating shaft with a thermal energy transfer portion that minimizes the transfer of thermal energy to internal clutch bearings and rather transfers the energy to a drive pulley where it is then dissipated. The present invention decreases fan clutch assembly operating temperature including internal clutch bearing operating temperature and thus increases fan clutch assembly operating performance and service life.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A clutch assembly for a fan drive system of an engine, said clutch assembly comprising:
   a translatable clutch housing;
   a coupling element comprising heat sink material adapted for absorbing and transferring thermal energy;
   a rotatable shaft having a grooved thermal energy transfer portion that is coupled to a thermally conductive drive pulley of said engine via said coupling element;
   said grooved thermal energy transfer portion of said shaft having a cross-sectional shaft width that is approximately equal to or greater than a quarter surface area attachment width of said drive pulley, and said quarter surface area attachment width being defined as a band width of a contact surface between said rotatable shaft and said drive pulley; and
   an engageable liner residing between said rotatable shaft and said translatable clutch housing;
   whereby thermal energy generated during engagement of said liner between said rotatable shaft and said translatable clutch housing is transferred through said grooved thermal energy transfer portion of said shaft and to said drive pulley via said coupling element.

2. A clutch assembly as in claim 1 wherein said heat sink material includes at least one material selected from the group consisting of aluminum, copper, and steel.

3. A clutch assembly as in claim 1, wherein said clutch assembly further includes additional coupling elements comprising heat sink material that are coupled between said thermal energy transfer portion of said rotatable shaft and said drive pulley.

4. A clutch assembly as in claim 1, wherein said thermal energy transfer portion of said rotatable shaft has a groove defined therein so that said groove is proximately aligned with a shaft contact surface of said coupling element.

5. A clutch assembly for a fan drive system of an engine, said clutch assembly comprising:
   a translatable clutch housing:
   a coupling element comprising heat sink material adapted for absorbing and transferring thermal energy;
   a rotatable shaft including a thermal energy transfer portion that is coupled to a thermally conductive drive pulley of said engine via said coupling element, said shaft having a plurality of thermal energy transfer grooves;
   said thermal energy transfer grooves comprising recessed rings defined in said rotatable shaft; and
   an engageable liner residing between said rotatable shaft and said translatable clutch housing;
   whereby thermal energy generated during engagement of said liner between said rotatable shaft and said translatable clutch housing is transferred through said thermal energy transfer portion of said shaft and to said drive pulley via said coupling element and said thermal energy transfer grooves.

6. A clutch assembly as in claim 5, wherein said thermal energy transfer grooves are defined in a side of said rotatable shaft opposite said drive pulley.

7. A clutch assembly as in claim 5, wherein said thermal energy transfer grooves are defined in a side of said rotatable shaft opposite said drive pulley and proximately aligned with contact surfaces between said rotatable shaft, said coupling element, and said drive pulley.

8. A clutch assembly as in claim 5, wherein said clutch assembly further includes additional coupling elements comprising heat sink material that are coupled between said thermal energy transfer portion of said rotatable shaft and said drive pulley.

9. A clutch assembly for a fan drive system of an engine, said clutch assembly comprising:
   a translatable clutch housing;
   a coupling element comprising heat sink material adapted for absorbing and transferring thermal energy;
   a rotatable shaft having a grooved thermal energy transfer portion that is coupled to a thermally conductive drive pulley of said engine via said coupling element;
   said grooved thermal energy transfer portion of said shaft having a cross-sectional shaft width that is approximately equal to or greater than a quarter surface area attachment width of said drive pulley, and said quarter surface area attachment width being defined as a band width of said coupling element; and
   an engageable liner residing between said rotatable shaft and said translatable clutch housing;
   whereby thermal energy generated during engagement of said liner between said rotatable shaft and said translatable clutch housing is transferred through said grooved thermal energy transfer portion of said shaft and to said drive pulley via said coupling element.

10. A clutch assembly for a fan drive system of an engine, said clutch assembly comprising:
    a translatable clutch housing;
    a coupling element comprising heat sink material adapted for absorbing and transferring thermal energy;
    a rotatable shaft having a grooved thermal energy transfer portion that is coupled to a thermally conductive drive pulley of said engine via said coupling element;
    said grooved thermal energy transfer portion of said shaft having a cross-sectional shaft width that is approximately equal to or greater than a quarter surface area attachment width of said drive pulley, and said rotatable shaft comprises a groove having a groove width that is approximately equal to or greater than said quarter surface area attachment width; and
    an engageable liner residing between said rotatable shaft and said translatable clutch housing;
    whereby thermal energy generated during engagement of said liner between said rotatable shaft and said translatable clutch housing is transferred through said grooved thermal energy transfer portion of said shaft and to said drive pulley via said coupling element.

11. A clutch assembly as in claim 10, wherein said groove has the form of a recessed ring defined in said rotatable shaft.

12. A clutch assembly as in claim 10, wherein said groove is defined in said rotatable shaft so as to be proximately aligned with a shaft contact surface of said drive pulley.

* * * * *